(12) United States Patent
Koide et al.

(10) Patent No.: US 8,151,912 B2
(45) Date of Patent: Apr. 10, 2012

(54) WHEELED INVERTED PENDULUM MOBILE UNIT

(75) Inventors: Mitsuo Koide, Nagoya (JP); Kazutoshi Sukigara, Nisshin (JP); Yuji Tsusaka, Aisai (JP); Takashi Izuo, Toyota (JP); Masaaki Yamaoka, Toyota (JP); Koji Yamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 443 days.

(21) Appl. No.: 12/398,549

(22) Filed: Mar. 5, 2009

(65) Prior Publication Data

US 2009/0223728 A1    Sep. 10, 2009

(30) Foreign Application Priority Data

Mar. 10, 2008   (JP) .................................. 2008-059608

(51) Int. Cl.
    *B62D 61/00*   (2006.01)
(52) U.S. Cl. .................... 180/7.1; 180/6.48; 180/218
(58) Field of Classification Search .................... 180/7.1, 180/8.1, 6.48, 6.5, 218
    See application file for complete search history.

(56) References Cited

U.S. PATENT DOCUMENTS

| | | | | |
|---|---|---|---|---|
| 7,082,350 B2 * | 7/2006 | Skoog | ............................ | 700/245 |
| 7,481,291 B2 * | 1/2009 | Nishikawa | .................... | 180/218 |
| 7,677,345 B2 * | 3/2010 | Hosoda | ........................ | 180/218 |
| 2008/0105481 A1 * | 5/2008 | Hutcheson et al. | ........... | 180/209 |
| 2008/0231222 A1 * | 9/2008 | Hashimoto et al. | ........... | 318/587 |

FOREIGN PATENT DOCUMENTS

| | | |
|---|---|---|
| JP | 2000-514680 T | 11/2000 |
| JP | 2002-019602 A | 1/2002 |
| JP | 2004-074814 A | 3/2004 |
| JP | 2004-217170 A | 8/2004 |
| JP | 2004-291799 A | 10/2004 |
| JP | 2005-288587 A | 10/2005 |
| JP | 2006-247802 A | 9/2006 |
| JP | 2007-145318 A | 6/2007 |
| JP | 2007-237750 A | 9/2007 |
| WO | WO 98/02122 A1 | 1/1998 |

* cited by examiner

*Primary Examiner* — Tony Winner
(74) *Attorney, Agent, or Firm* — Kenyon & Kenyon LLP

(57) ABSTRACT

A wheeled inverted pendulum mobile unit having: a driving wheel; a body that is tiltable about an axle of the driving wheel with respect to a vertical direction; a plurality of support members that extend downward from the body in the vertical direction, wherein the bottom ends of the plurality of support members are in contact with a ground before and behind the axle of the driving wheel, and the bottom ends moves up and down, with respect to the body, as the body tilts with respect to the vertical direction; and a lock mechanism that locks positions of the bottom ends of the support members with respect to the body.

15 Claims, 6 Drawing Sheets

WHEELED INVERTED PENDULUM MOBILE UNIT

INCORPORATION BY REFERENCE

The disclosure of Japanese Patent Application No. 2008-059608 filed on Mar. 10, 2008 including the specification, drawings and abstract is incorporated herein by reference in its entirety.

BACKGROUND OF THE INVENTION

1. Field of the Invention

The invention relates to a wheeled inverted pendulum mobile unit.

2. Description of the Related Art

A "wheeled inverted pendulum mobile unit" in the specification is a wheeled mobile unit that runs with a single driving wheel or a plurality of coaxially arranged driving wheels, and means a mobile unit that runs while keeping the balance of the body that is tiltable about the axle(s) of the driving wheel(s). In the specification, the "wheeled inverted pendulum mobile unit" is simply referred to as "mobile unit" as needed.

The center of gravity of the body of the wheeled inverted pendulum mobile unit is located above the axle(s) of the driving wheel(s). Thus, the wheeled inverted pendulum mobile unit is unstable unless the balance of the mobile unit is controlled. The "unstable" means that, while keeping the balance of the body, a small disturbance causes the body to lose its balance. Thus, all state quantities (state functions) or a portion of state quantities of the body and wheel(s) are subjected to a feedback control to stabilize the posture of the body (tilting angle of the body with respect to a vertical direction). This control is termed the "inverted pendulum control" in the specification. To be simple, a control for maintaining the tilting angle of the body by driving the driving wheels is termed as the "inverted pendulum control".

The wheeled inverted pendulum mobile unit is an unstable system in terms of control. That is, if the inverted pendulum control stops, the body falls. Alternatively, if the inverted pendulum control malfunctions, the body falls. Thus, the wheeled inverted pendulum mobile unit includes auxiliary support members in order to prevent the body from falling. For example, Japanese Patent Application Publication No. 2006-247802 (JP-A-2006-247802) describes a moving robot. The moving robot is equipped with support legs, which can be raised or lowered, and is controlled through an inverted pendulum control. During the inverted pendulum control, the moving robot keeps the support legs away from the ground. When the inverted pendulum control is stopped or when the inverted pendulum control malfunctions because of an unexpected event, the moving robot lowers the support legs to contact the ground. Thus, the lowered support leg supports the body to prevent the body from falling.

The support legs of the moving robot described in JP-A-2006-247802 does not contact the ground during the inverted pendulum control. At the time the inverted pendulum control is stopped or at the time the inverted pendulum control malfunctions, the moving robot lowers the support leg. Thus, there is a time lag between the time the inverted pendulum control malfunctions and the time the support leg contacts the ground. During the time lag, the body is unstable and, therefore, variation in the tilting angle of the body may occur. In addition, when the wheeled inverted pendulum mobile unit carries a person, the time lag, during which the body cannot be controlled at a constant tilting angle, makes the rider feel uneasy. Not only in the occurrence of an unexpected event but also when the inverted pendulum control is stopped, a time lag between the time the inverted pendulum control is stopped and the support leg contacts the ground causes a similar problem.

SUMMARY OF THE INVENTION

The invention provides a wheeled inverted pendulum mobile unit that is able to support its body by a support member without a time lag when an inverted pendulum control malfunctions because of an occurrence of an unexpected event or when the inverted pendulum control is stopped.

A first aspect of the invention is related to a wheeled inverted pendulum mobile unit. The wheeled inverted pendulum mobile unit includes: a driving wheel; a body that is tiltable about an axle of the driving wheel with respect to a vertical direction; a plurality of support members that extend downward from the body in the vertical direction, wherein the bottom ends of the plurality of support members are in contact with a ground before and behind the axle of the driving wheel, and the bottom ends moves up and down, with respect to the body, as the body tilts with respect to the vertical direction; and a lock mechanism that locks positions of the bottom ends of the support members with respect to the body.

The support members each are attached to the body using, for example, a spring. Thus, the bottom ends of the support members are in contact with the ground irrespective of whether the inverted pendulum control is activated or deactivated and are able to move up and down with respect to the body as the body tilts. Hence, the support members are constantly in contact with the ground but do not interfere with the inverted pendulum control. When the inverted pendulum control malfunctions because of occurrence of an unexpected event or when the inverted pendulum control is stopped, the lock mechanism is activated to lock the positions of the bottom ends of the support members with respect to the body. With the support members that are movable up and down and the lock mechanism, it is possible to support the body by the support members without a time lag at the time the inverted pendulum control shifts from a functioning state into a non-functioning state.

The wheeled inverted pendulum mobile unit is in contact with the ground only by the driving wheel(s) (a single wheel or a plurality of coaxially arranged wheels) while keeping the balance of the body. Thus, while the inverted pendulum control is functioning normally, a member other than the driving wheel(s) is generally not caused to be in contact with the ground. According to the above aspect, the support members are in contact with the ground so that they are movable up and down even when the inverted pendulum control is functioning. Thus, it is possible to support the body by the support members without a time lag at the time the inverted pendulum control shifts from a functioning state into a non-functioning state.

A second aspect of the invention is related to a wheeled inverted pendulum mobile unit. The wheeled inverted pendulum mobile unit includes: a driving wheel; a body that is tiltable about an axle of the driving wheel with respect to a vertical direction;

a plurality of support members that extend downward from the body in the vertical direction, wherein the bottom ends of the plurality of support members are in contact with a ground before and behind the axle of the driving wheel, and the bottom ends moves up and down, with respect to the body, as the body tilts with respect to the vertical direction:

a lock mechanism that locks positions of the bottom ends of the support members with respect to the body; and a control unit that executes an inverted pendulum control on the body by driving the driving wheel. The plurality of support members are in contact with the ground without applying a force to the ground during the inverted pendulum control.

By releasing the lock mechanism, the plurality of support members are in contact with the ground without applying a force to the ground during the inverted pendulum control.

A third aspect of the invention is related to a wheeled inverted pendulum mobile unit. The wheeled inverted pendulum mobile unit includes: a driving wheel; a body that is tiltable about an axle of the driving wheel with respect to a vertical direction; a plurality of support members that extend downward from the body in the vertical direction, wherein the bottom ends of the plurality of support members are in contact with a ground, and the bottom ends moves up and down, with respect to the body, as the body tilts with respect to the vertical direction; and a lock mechanism that locks positions of the bottom ends of the support members with respect to the body.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

A wheeled inverted pendulum mobile unit 100 (hereinafter, simply referred to as "mobile unit 100") according to an embodiment of the invention will be described with reference to the accompanying drawings. First, the technical characteristics of the mobile unit 100 according to the embodiment will be explained below. In a first characteristic, support legs 20a and 20b are urged by elastic members (springs 24a and 24b) so that the bottom ends of the support legs 20a and 20b are constantly in contact with a ground. The urging force of each spring may be weakened so that the urging force does not interfere with tilting of a body 10. In a second characteristic, when a slip is detected, an inverted pendulum control is stopped.

Figure 1A:
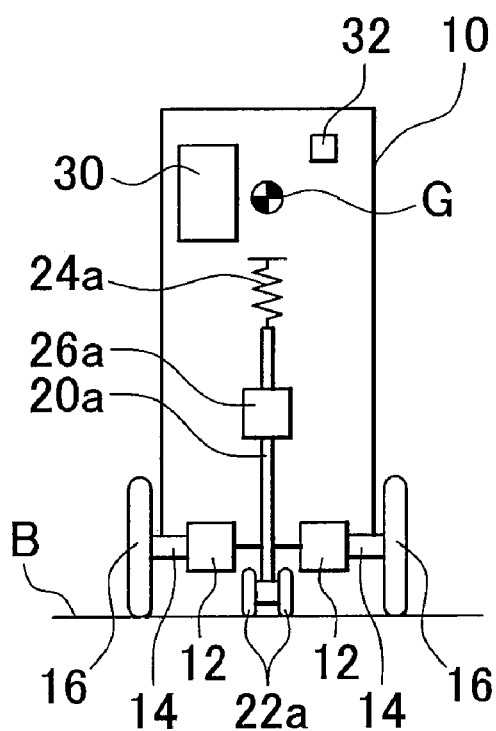
FIG. 1A and FIG. 1B are schematic views of a wheeled inverted pendulum mobile unit.
Figure 1B:
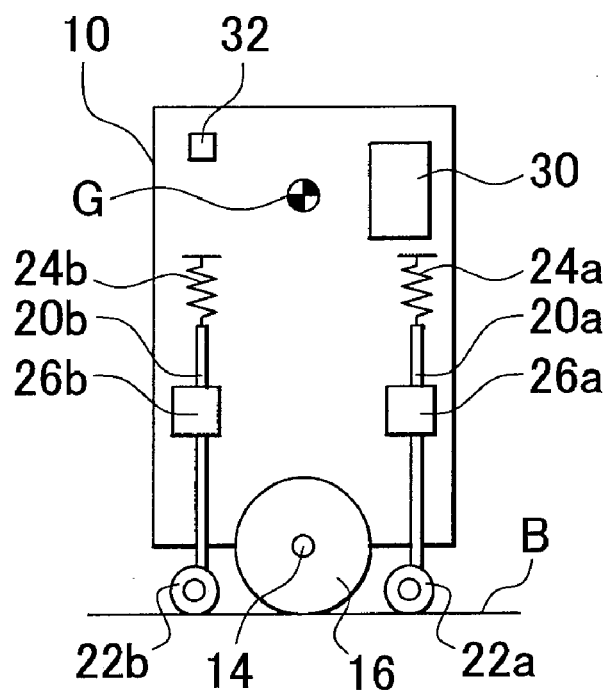
Figure 2:
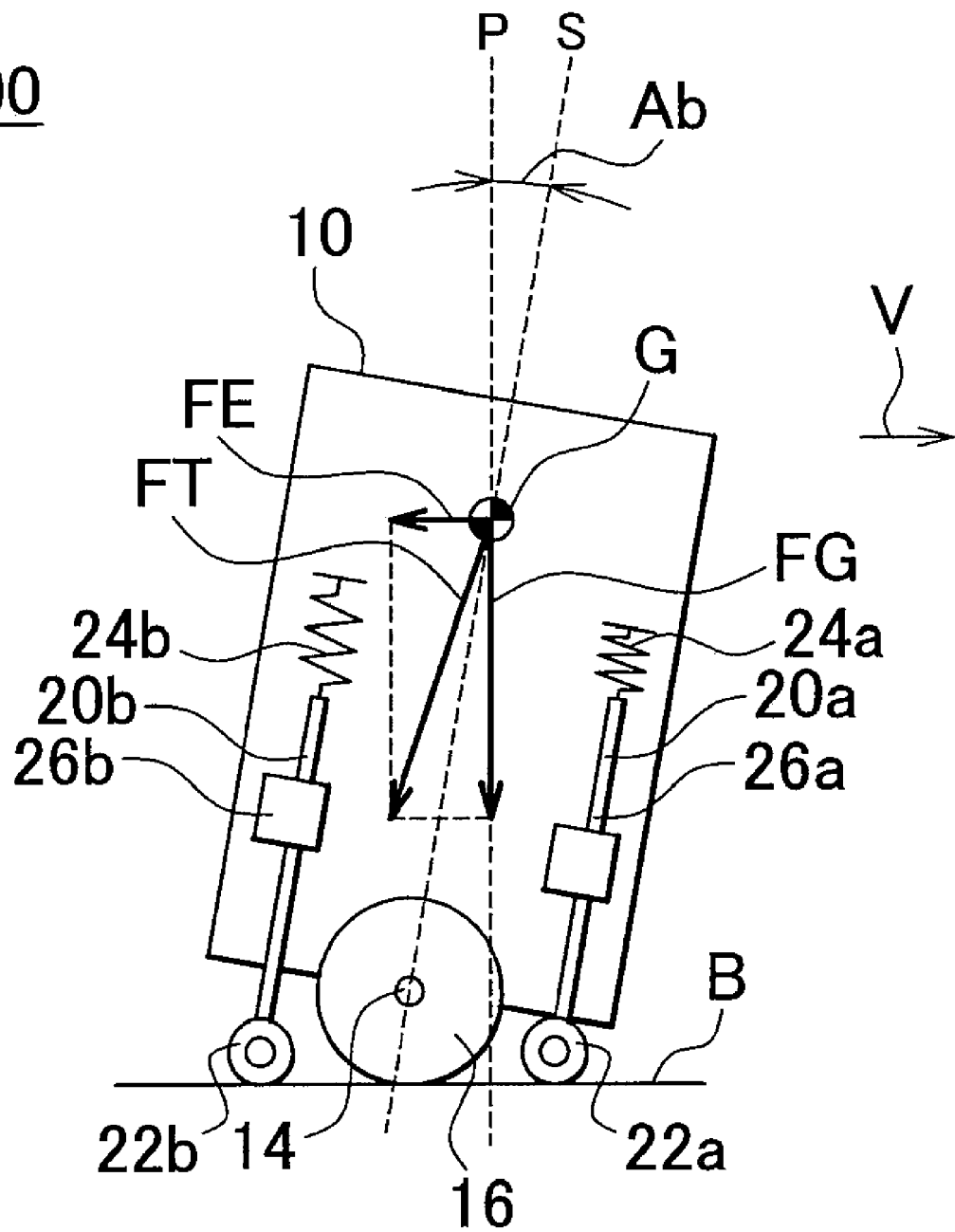
FIG. 2 is a schematic view that shows the mobile unit of which the body is tilted.

FIG. 1A is a schematic front view of the mobile unit 100. FIG. 1B is a schematic side view of the mobile unit 100. FIG. 2 is a schematic side view that shows a state where the body 10 of the mobile unit 100 is tilted. Note that in FIG. 1A, FIG. 1B and FIG. 2, the components provided inside the body 10 are also drawn by the solid line for easy understanding. In FIG. 1A, FIG. 1B and FIG. 2, the reference sign B denotes a ground, and the reference sign G denotes the center of gravity of the body 10.

The mobile unit 100 includes the body 10, a pair of driving wheels 16 and the pair of support legs 20a and 20b. The pair of driving wheels 16 are coaxially arranged. The driving wheels 16 are coupled to motors 12 via axles 14, respectively. That is, the driving wheels 16 are driven by the motors 12.

The pair of support legs 20a and 20b have a similar structure. The bottom ends of the pair of support legs 20a and 20b are in contact with the ground before and behind the axles 14. The support legs 20a and 20b extend downward from the body 10. Auxiliary wheels 22a and 22b are attached to the bottom ends of the support legs 20a and 20b. The support legs 20a and 20b are coupled to the body using the springs 24a and 24b. The support legs 20a and 20b are urged downward by the springs 24a and 24b so that the auxiliary wheels 22a and 22b are constantly in contact with the ground. In addition, the support legs 20a and 20b are slidable upward and downward direction of the body 10 by means of the springs 24a and 24b. That is, the bottom ends (auxiliary wheels 22a and 22b) of the support legs 20a and 20b that keep in contact with the ground moves up and down as the body 10 tilts. The urging force of each of the springs 24a and 24b is weakened so that the urging force does not interfere with tilting of the body 10. That is, the body 10 cannot be prevented from falling only by the urging force of the springs 24a and 24b.

Brakes 26a and 26b (lock mechanism) are arranged in the middle of the support legs 20a and 20b respectively. The brakes 26a and 26b respectively lock the positions of the bottom ends of the support legs 20a and 20b with respect to the body 10. The brakes 26a and 26b receive instructions from a controller 30 provided inside the body 10, and then lock the positions of the bottom ends of the support legs 20a and 20b or release the locked positions, respectively. In the description below, the locking the positions of the bottom ends of the support legs 20a and 20b may sometimes be expressed as locking the support legs 20a and 20b.

A gyroscope 32 is mounted on the body 10. The gyroscope 32 detects the angular velocity at which the body 10 tilts about the axles 14. The output signal of the gyroscope 32 is transmitted to the controller 30.

Although not shown in the drawing, the mobile unit 100 is equipped with: rotational angle sensors (for example, encoders) that detect the rotational angles of the respective auxiliary wheels 22a and 22b; and rotational angle sensors (for example, encoders) that detect the rotational angles of the respective driving wheels 16. The rotational angular speed may be calculated from the rotational angles of the auxiliary wheels 22a and 22b and the rotational angles of the driving wheels 16, respectively.

The inverted pendulum control will be generally described with reference to FIG. 2. As shown in FIG. 2, the straight line P represents a vertical line that passes the center of gravity G of the mobile unit 100. The straight line S represents a line that passes the center of gravity G and the axles 14. The angle Ab represents the tilt of the body 10 with respect to the vertical line P (tilt of the body 10 about the axles 14; referred to as body tilting angle Ab).

The pair of support legs 20a and 20b extend and contract as the body 10 tilts while the brakes 26a and 26b are released (unlocked). Thus, while the brakes 26a and 26b are released (unlocked), the body 10 falls unless the inverted pendulum control is activated. The inverted pendulum control drives the driving wheels to prevent the body from falling (keeps the balance of the body 10).

As shown in FIG. 2, gravitational force acts on the body 10. The gravitational force may be expressed by a vertically downward-pointing vector FG that passes the center of gravity G of the body 10. On the other hand, when the driving wheels 16 are driven, a horizontal inertial force acts on the body 10. As indicated by the arrow V in FIG. 2, the inertial force caused by driving the driving wheels 16 so as to accelerate the mobile unit 100 rightward in FIG. 2 may be expressed by a horizontally leftward-pointing vector FE that passes the center of gravity G. The resultant vector of the gravitational force vector FG and the inertial force vector FE is denoted by the reference sign FT. The resultant vector FT causes a moment about the axles 14. The inverted pendulum control controls the driving wheels 16 to change the direction of the resultant vector FT, that is, the direction and magnitude of the moment about the axles 14. The inverted pendulum control changes the direction and magnitude of the moment about the axles 14 so as to keep the balance of the body 10.

To correct the body tilting angle Ab while keeping the balance of the body 10, when the body 10 is tilted rightward, a clockwise moment applied from the body 10 to the driving wheels 16 accelerates the wheels rightward to make the body 10 upright. When the body 10 is tilted leftward, vice versa. In this way, by adjusting a driving force applied to each of the driving wheels 16, the body tilting angle Ab is brought close to a desired angle. That is, it is possible to keep the balance of the body 10. When the body tilting angle Ab is controlled so that the straight line S coincides with the vertical line P, it is possible to cause the mobile unit 100 to stop or run at a constant speed while keeping the balance of the body 10. By controlling the body tilting angle Ab, (that is, the mobile unit 100 appropriately controls a driving force applied to each of the driving wheels 16) the mobile unit 100 is able to accelerate or decelerate while keeping the balance of the body 10.

The auxiliary wheels 22a and 22b of the mobile unit 100 are constantly in contact with the ground. While the brakes 26a and 26b are released (unlocked), the support legs 20a and 20b are freely slidable and do not support the body 10. Thus, the inverted pendulum control allows the mobile unit 100 to move around while keeping the balance of the body 10. When the inverted pendulum control is stopped or when the inverted pendulum control malfunctions due to occurrence of an unexpected event (that is, when it is difficult for the inverted pendulum control to keep the balance of the body 10), the brakes 26a and 26b are activated to lock the support legs 20a and 20b. Thus, it is possible to stably support the body 10 by the support legs 20a and 20b.

Here, the auxiliary wheels 22a and 22b at the distal ends of the support legs are constantly in contact with the ground, so the body 10 may be supported immediately after the brakes 26a and 26b are activated. When the inverted pendulum control is stopped as scheduled or when the inverted pendulum control is urgently stopped because of an unexpected event being detected, the support legs 20a and 20b being locked are able to immediately (without a time lag) and stably support the body 10. Thus, the body 10 does not wobble at the time the inverted pendulum control is stopped.

In the related art described in JP-A-2006-247802, the mobile unit keeps the balance of the body by the "inverted pendulum control", and, in order to permit variation in the body tilting angle, the mobile unit retracts the support legs while the pendulum control is executed. Therefore, the support legs are located a predetermined distance above from the ground. This is because, when the support legs are in contact with the ground during the inverted pendulum control, a force that each support leg receives from the ground (floor reaction force) interferes with the inverted pendulum control. For this reason, there is a time lag between the time when the support leg starts moving down and the time when the support leg contacts the ground. Therefore, the body tilting angle may be unstable during the time lag.

In addition, in the manner in which the support legs are located above the ground, the inverted pendulum control needs to be stopped before the support leg contacts the ground. Although the body tilting angle may be corrected by the inverted pendulum control, when the body tilting angle varies in a state where the support leg is lowered near the ground, the support leg may strongly collide with the ground and, therefore, the balance of the body may be deteriorated adversely.

In the mobile unit 100 according to the present embodiment, while the brakes 26a and 26b are released (while the positions of the bottom ends of the support legs 20a and 20b with respect to the body 10 are not locked), the support legs 20a and 20b are slidably movable and, therefore, the support legs 20a and 20b are in contact with the ground, but the support legs 20a and 20b do not interfere with the inverted pendulum control. Even when the brakes 26a and 26b are locked (even when the positions of the bottom ends of the support legs 20a and 20b with respect to the body 10 are locked) at the same time as the inverted pendulum control is stopped, it is possible to smoothly shift the body 10 into a state of being supported by the support legs without losing the balance of the body 10.

Furthermore, the mobile unit 100 of the present embodiment is able to run in a state where the support legs 20a and 20b support the body 10. The mode in which the mobile unit 100 runs with the body 10 supported by the support legs 20a and 20b may be termed as "four-wheel mode" as needed. The mode in which the mobile unit 100 runs with the body 10 supported only by the driving wheels 16 while keeping the balance of the body 10 is termed as "two-wheel mode". Note that the expressions "two-wheel mode" and "four-wheel mode" do not limit the number of wheels.

Figure 3:
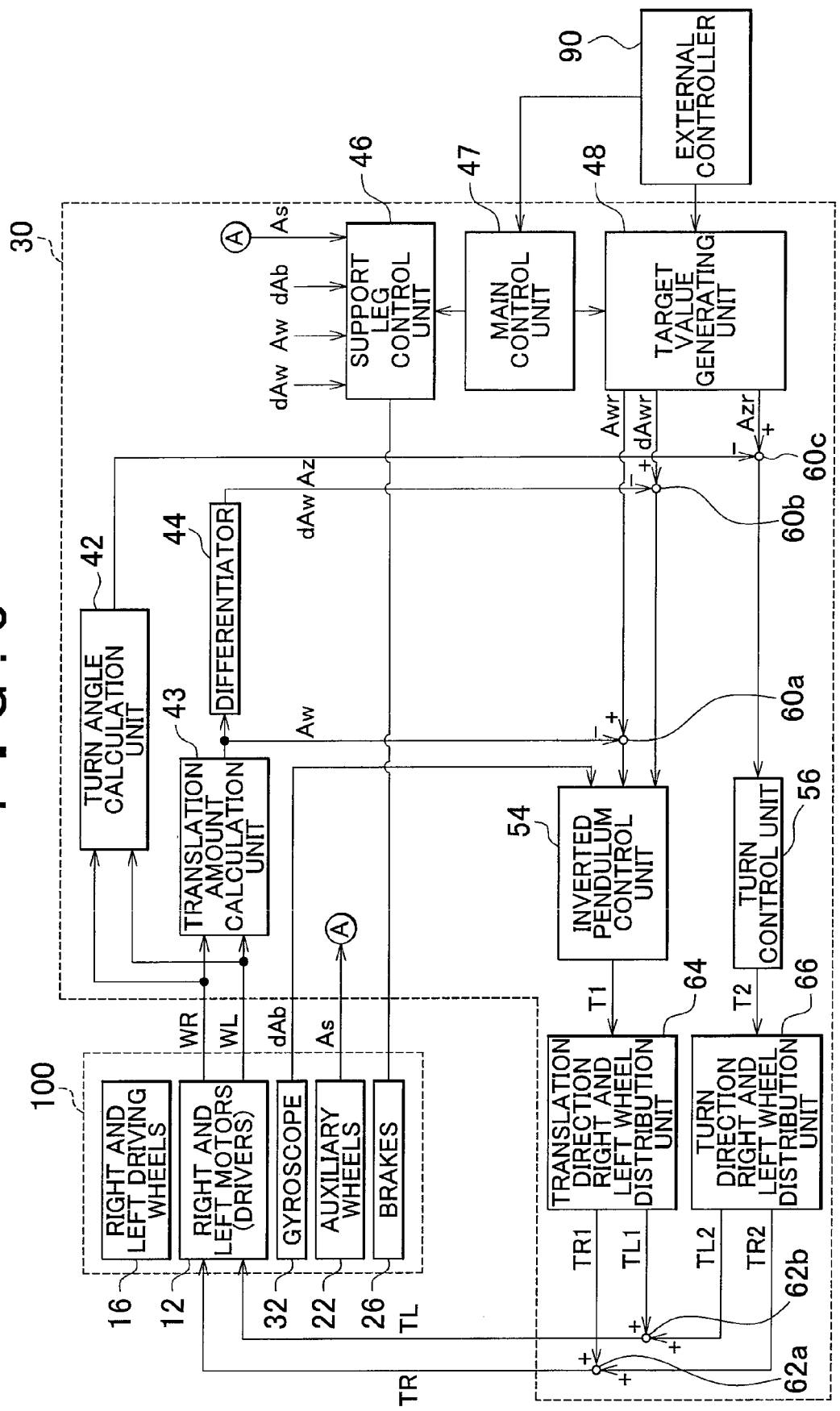
FIG. 3 is a block diagram of the mobile unit.

Next, the configuration of the controller 30 of the mobile unit 100 and the operation of the mobile unit 100 will be described. FIG. 3 is a block diagram of the mobile unit 100. FIG. 3 particularly shows the detailed block diagram of the inside of the controller 30. Note that in FIG. 3, the controller 30 is separately drawn from the mobile unit 100 for easy understanding. Actually, as shown in FIG. 1A and FIG. 1B, the controller 30 also constitutes portion of the mobile unit 100.

The controller 30 mainly includes a main control unit 47, a support leg control unit 46, a target value generating unit 48, an inverted pendulum control unit 54, and a turn control unit 56. The controller 30 further includes a turning angle calculation unit 42, a translation amount calculation unit 43, a differentiator 44, a translation direction right and left wheel distribution unit 64, a turning direction right and left wheel distribution unit 66, subtractors 60a, 60b and 60c, and adders 62a and 62b. These modules (support leg control unit 46, and the like) are implemented as programs executed by a CPU of the controller 30.

The reference signs "WR" and "WL" in FIG. 3 respectively represent the rotational angles of the right and left driving wheels 16. The pair of rotational angle sensors attached to the pair of motors 12 detect the respective right and left wheel rotational angles "WR" and "WL". That is, while the mobile unit 100 is turning, the values of the rotational angles "WR" and "WL" are different from each other. The translation amount calculation unit 43 calculates a translation amount Aw at the center of the axles from the right and left wheel rotational angles "WR" and "WL". The translation amount Aw at the center of the axles may be obtained so that, for example, the right and left wheel rotational angles "WR" and "WL" are added, divided by two, and then multiplied by a wheel radius r (Expression 1).

$$Aw = \frac{r}{2}(WR + WL) \qquad \text{[Expression 1]}$$

The translation amount Aw is differentiated by the differentiator 44 to obtain a translation velocity dAw. A generally used differential operation is performed in the differentiator (Expression 2).

$$dAw = \frac{d}{dt}Aw \qquad \text{[Mathematical Expression 2]}$$

The reference sign Az in FIG. 3 represents the turning angle of the mobile unit 100. The turning angle means a direction angle (direction) with respect to a reference direction of the mobile unit 100 within a horizontal plane. The turning angle calculation unit 42 calculates the turning angle Az of the axles 14 within the horizontal plane from the rotational angles "WR" and "WL" of the right and left wheels. The turning angle Az of the axles 14 within the horizontal plane may be obtained so that, for example, a difference between the rotational angles "WR" and "WL" of the right and left wheels is multiplied by the wheel radius r and then divided by half the length of the tread width between the wheels d (Expression 3).

$$Az = \frac{r}{d}(WR - WL) \qquad \text{[Expression 3]}$$

The reference sign "dAb" in FIG. 3 represents the angular velocity of the tilting angle of the body 10 with respect to the vertical direction (body tilting angular velocity). The gyroscope 32 attached to the body 10 detects the body tilting angular velocity dAb. The body tilting angle Ab may be obtained by integrating the body tilting angular velocity dAb. The reference sign "As" in FIG. 3 represents the rotational angles of the auxiliary wheels 22a and 22b. The rotational angle sensors (not shown) attached to the auxiliary wheels 22a and 22b detect the rotational angles As. The rotational angles As detected by the rotational angle sensors of the auxiliary wheels 22a and 22b are input to the support leg control unit 46. In FIG. 3, to avoid a complex block diagram, the lines of the rotational angles As connecting the auxiliary wheels 22a and 22b with the support leg control unit 46 is omitted. Note that the rotational angular velocities of the auxiliary wheels 22a and 22b may be obtained by differentiating the rotational angles As. To avoid a complex block diagram, portion of the lines that represent signals (translation amount Aw, translation velocity dAw, and body tilting angular velocity dAb) input to the support leg control unit 46 is also omitted from the drawing.

The mobile unit 100 is operated by receiving commands from an external controller 90. Major commands transmitted from the external controller 90 include a two-wheel mode command, a four-wheel mode command, and a stop command. The "two-wheel mode command" makes the mobile unit 100 to run in the two-wheel mode (mode in which the mobile unit 100 runs while keeping the balance of the body 10 without being supported by the support legs 20a and 20b). The "four-wheel mode command" makes the mobile unit 100 to run in the four-wheel mode (mode in which the mobile unit 100 runs with the body 10 supported by the support legs 20a and 20b). The two-wheel mode command and the four-wheel mode command each include data of a target track in which the mobile unit 100 follows (including a velocity at which the mobile unit 100 moves along the target track).

First, the function of the controller 30 will be generally described. The details of the modules inside the controller 30 will be described later. A command from the external controller 90 is input to the main control unit 47. The main control unit 47 analyzes the command and controls the other control modules. The target track data transmitted from the external controller 90 are transmitted from the main control unit 47 to the target value generating unit 48.

In the two-wheel mode, the controller 30 calculates a torque command value for driving the driving wheels 16 to follow the target track, and then the controller 30 outputs the torque command value to the motors 12 (motor drivers) while keeping the balance of the body 10. While keeping the balance of the body, the torque command value for causing the mobile unit 100 to run in a straight line is calculated by the inverted pendulum control unit 54. That is, the torque command value (T1) output from the inverted pendulum control unit 54 is distributed by the translation direction right and left wheel distribution unit 64 into torque command values (TR1 and TL1) for the right and left driving wheels 16. In the translation direction right and left wheel distribution unit 64, for example, the torque command value input from the inverted pendulum control unit 54 is divided into halves for the torque command values of the right and left wheels (Expression 4). When the friction characteristic, or the like, differs between the right and left wheels, that is, the characteristic or sensitivity against the torque command value differs therebetween, friction compensation may be performed so that the torque command value differs between the right and left wheels or torque distribution for the right and left wheels may be performed by multiplying the coefficient corresponding to the sensitivity.

$$TR1 = \frac{1}{2}T1 \qquad \text{[Expression 4]}$$
$$TL1 = \frac{1}{2}T1$$

Separately from the inverted pendulum control unit 54, the turn control unit 56 calculates a torque command value for turning the mobile unit 100 follow the target track. The torque command value (T2) output from the turn control unit 56 is a torque value necessary for turning the mobile unit 100, and is obtained by calculating a turning torque corresponding to a deviation in turning angle. In the turning direction right and left wheel distribution unit 66, the torque value input from the turn control unit 56 is distributed into torque values (TR2 and TL2) of the right and left driving wheels. In the turning direction right and left wheel distribution unit 66, for example, the input from the turn control unit 56 is multiplied by the wheel radius r with opposite signs respectively for the right and left wheels, divided by half the length of the tread width between the wheels d and then divided by two, thus making it possible to distribute the torque value to the right and left wheel torque values (Expression 5).

$$TR2 = +\frac{r}{2d}T2 \qquad \text{[Expression 5]}$$
$$TL2 = -\frac{r}{2d}T2$$

The torque command values (TR1 and TL1) output from the translation direction right and left wheel distribution unit 64 and the torque command values (TR2 and TL2) output from the turning direction right and left wheel distribution unit 66 are added in the adders 62a and 62b respectively for the right and left wheels, and output to the right and left motors 12 (motor drivers) as the right and left motor torque command values (TR and TL). Basically, the right and left motors 12 (motor drivers) operate in accordance with the added command values, so the mobile unit 100 follows along the target track while keeping the balance of the body 10.

When the control system of the inverted pendulum control unit 54 is being designed, the mobile unit 100 is modeled considering contacts between the support legs 20a and 20b (auxiliary wheels 22a and 22b) and the ground. The control system of the inverted pendulum control unit 54 is designed on the basis of the model of the mobile unit 100. That is, the inverted pendulum control unit 54 outputs the torque command value that considers the influence of floor reaction force. The model of the mobile unit 100 will be described later. The support leg control unit 46 is a module that controls the brakes 26a and 26b. The support leg control unit 46 activates the brakes 26a and 26b when any one of emergency stop conditions, which will be described later, is satisfied. When the brakes 26a and 26b are activated, the support legs 20a and 20b are locked. That is, the support legs 20a and 20b stably support the body 10. When the brakes 26a and 26b are released, the support legs 20a and 20b keep the auxiliary wheels 22a and 22b in contact with the ground while sliding in accordance with the body tilting angle.

During the two-wheel mode, the inverted pendulum control unit 54 receives signals from the subtractors 60a and 60b together with the body tilting angular velocity dAb. That is, the torques for the right and left motors 12 are calculated and output, so that while keeping the inverted posture, the differences between the target values Awr and dAwr and the values Aw and dAw respectively are reduced at the same time.

Next, the control modules will be described. The target value generating unit 48 resolves the target track into a target translation velocity dAwr and target turning angle Azr of the mobile unit 100. The target translation velocity is expressed by the velocity in the tangential direction of the target track. The target turning angle is expressed by the direction of the tangent of the target track. The target value generating unit 48 outputs the target translation velocity dAwr and the target translation amount Awr that is obtained by integrating the target translation velocity dAwr. The target value generating unit 48 also outputs the target turning angle Azr.

Next, the inverted pendulum control unit 54 will be described. The target translation amount Awr output from the target value generating unit 48 is input to the subtractor 60a. The subtractor 60a calculates a difference between the target translation amount Awr and the actual translation amount Aw of the mobile unit 100. The difference is input to the inverted pendulum control unit 54. The target translation velocity dAwr output from the target value generating unit 48 is input to the subtractor 60b. The subtractor 60b calculates a difference between the target translation velocity dAwr and the actual translation velocity dAw of the mobile unit 100. The calculated difference is input to the inverted pendulum control unit 54. The inverted pendulum control unit 54 also receives the body tilting angular velocity dAb. The inverted pendulum control unit 54 integrates the body tilting angular velocity dAb to obtain the body tilting angle Ab. Then, the inverted pendulum control unit 54 calculates the torque command value such that, while keeping the balance of the body 10, the differences output from the subtractors 60a and 60b are reduced. The body tilting angle Ab and the body tilting angular velocity dAb are utilized in the condition for keeping the balance of the body. The control law for keeping the balance of the body 10 may, for example, employ an H-infinity control. By employing the H-infinity control, a robust inverted pendulum control may be implemented.

Next, the turn control unit 56 will be described. The target turning angle Azr output from the target value generating unit 48 is input to the subtractor 60c. The subtractor 60c calculates a difference between the target turning angle Azr and the actual turning angle Az of the mobile unit 100. The calculated difference is input to the turn control unit 56. The turn control unit 56 calculates torque values applied to the right and left driving wheels 16 for reducing the difference output from the subtractor 60c and then outputs the torque command value. In the turn control unit 56, the control law for reducing a deviation in the turning angle may, for example, employ a PID control. The torque command value output from the turn control unit 56 is distributed by the turning direction right and left wheel distribution unit 66 into torque values of the right and left driving wheels.

The torque command values output from the translation direction right and left wheel distribution unit 64 and the torque command values output from the turning direction right and left wheel distribution unit 66 are added by the adders 62a and 62b respectively for the right and left wheels and input to the right and left motors 12 (motor drivers). The motors 12 (motor drivers) operate in accordance with the torque command values, so the mobile unit 100 follows the target track while keeping the balance of the body 10. The control system based on the model that considers the floor reaction force is constructed in the inverted pendulum control unit 54, so it is possible to keep the balance of the body 10 even with a floor reaction force.

Next, the support leg control unit 46 will be described. Although not shown in the drawing, the support leg control unit 46 controls the brakes 26a and 26b in association with the inverted pendulum control unit 54. That is, when a command for initiating the control on the mobile unit 100 (two-wheel mode command or four-wheel mode command) is input from the external controller 90, the inverted pendulum control unit 54 initiates the control, and the support leg control unit 46 releases the brakes 26a and 26b (allows the support legs 20a and 20b to slide as the body 10 tilts). When a command for stopping the control on the mobile unit 100 is input from the external controller 90, the inverted pendulum control unit 54 stops the control, and the support leg control unit 46 activates the brakes 26a and 26b (locks the support legs 20a and 20b).

The support leg control unit 46 activates the brakes 26a and 26b and instructs the inverted pendulum control unit 54 to stop the control when any one of the following conditions (emergency stop conditions) is satisfied.
(1) Tilting angle condition that the body tilting angle Ab exceeds a predetermined allowable angle range
(2) Tilting angular velocity condition that the body tilting angular velocity dAb exceeds a predetermined allowable tilting angular velocity range
(3) Running velocity condition that the translation velocity dAw of the mobile unit 100 exceeds a predetermined allowable velocity range
The predetermined allowable angle range, and so on, are set on the basis of the dynamic characteristic of the mobile unit 100, and are stored in the controller 30. All the above emergency stop conditions make it difficult to keep the balance of the body 10. When any one of the emergency stop conditions is satisfied, the support legs 20a and 20b are locked, and the inverted pendulum control is stopped. Thus, it is possible to quickly and stably support the body 10 without an unstable body tilting angle.

Figure 4:
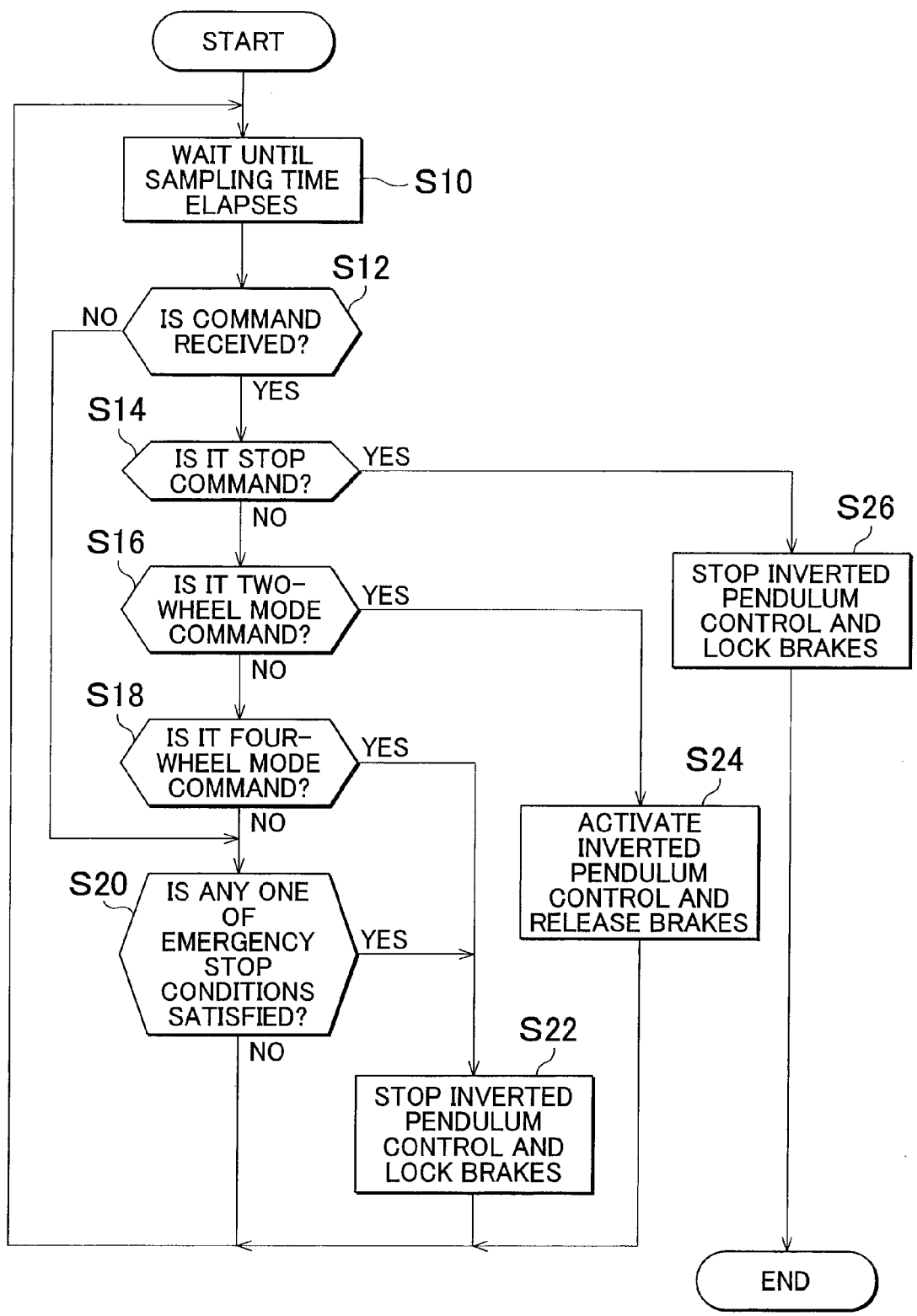
FIG. 4 is a flowchart of a main routine.

Next, the operation flow of the entire controller 30 will be generally described. FIG. 4 is a flowchart of a main routine executed by the controller 30.

The controller 30 waits until a predetermined sampling time elapses (step S10). During this time, the controller 30 receives a command from the external controller 90. Major commands received from the external controller 90 include "two-wheel mode command", "four-wheel mode command", and "stop command", as described above.

When the controller 30 receives a command before the predetermined sampling time elapses (step S12: YES), the controller 30 executes a process corresponding to the command (steps S22, S24 and S26). When the controller 30 does not receive a command before the predetermined sampling time elapses (step S12: NO), the process proceeds to step S20.

When the controller 30 receives the "stop command" (step S14: YES), the controller 30 locks the brakes 26a and 26b (that is, locks the support legs 20a and 20b) and stops the inverted pendulum control (if the inverted pendulum control is being activated) (step S26). Then, the controller 30 ends the main routine.

When the controller 30 receives the "two-wheel mode command" (step S16: YES), the controller 30 releases (unlocks) the brakes 26a and 26b (that is, allows the support legs 20a and 20b to slide) and executes the above described inverted pendulum control (step S24). The controller 30 controls the motors 12 (driving wheels 16) so as the mobile unit 100 follow the target track while keeping the balance of the body 10.

When the controller 30 receives the "four-wheel command mode", the controller 30 locks the brakes 26a and 26b (that is, locks the support legs 20a and 20b) and stops the inverted pendulum control (step S22). In step S22, the controller 30 controls the motors 12 (driving wheels 16) so as the mobile unit 100 follows the track without the inverted pendulum control.

When the determination in step S12 is "NO", the controller 30 checks whether any one of the above described emergency stop conditions is satisfied (step S20). When any one of the emergency stop conditions is satisfied (step S20: YES), the process proceeds to step S22. That is, the controller 30 locks the brakes 26a and 26b and stops the inverted pendulum control. In more detail, in step S20, the controller 30 checks whether any one of the three emergency stop conditions (tilting angle condition, tilting angular velocity condition, and running velocity condition) is satisfied. Checking for the conditions may be executed in parallel. When the determination in step S20 is "NO", after execution of step S22, or after execution of step S24, the controller 30 waits again until the predetermined sampling time elapses (step S10).

The mobile unit 100 is robust against a slip of the driving wheels 16. The control at the time a slip occurs will be described. The control at an occurrence of a slip is executed in parallel with the process shown in FIG. 4 when the mobile unit 100 is in the two-wheel mode. When the rotational angular velocities of the driving wheels 16 differ from the rotational angular velocities of the auxiliary wheels 22a and 22b, occurrence of a slip is detected. When a slip is detected, the controller 30 stops the inverted pendulum control and limits the angular velocities of the driving wheels 16. Specifically, the angular velocities of the driving wheels 16 with respect to the body 10 are limited between upper and lower limit values with respect to wheel velocities corresponding to the velocity of the body 10, obtained from the rotational velocities of the auxiliary wheels 22a and 22b. In other words, the slip ratio is limited within a predetermined range. By limiting the angular velocities of the driving wheels 16, it is possible to increase the likelihood that a slip stops. The reason why the inverted pendulum control is stopped is that the driving force of each driving wheel is not transmitted to the ground while slipping and, therefore, it is difficult to keep the balance of the body. However, occurrence of a slip is temporary in many cases, and, if occurrence of a slip is detected, it is not necessary to immediately lock the brakes 26a and 26b.

Figure 5:
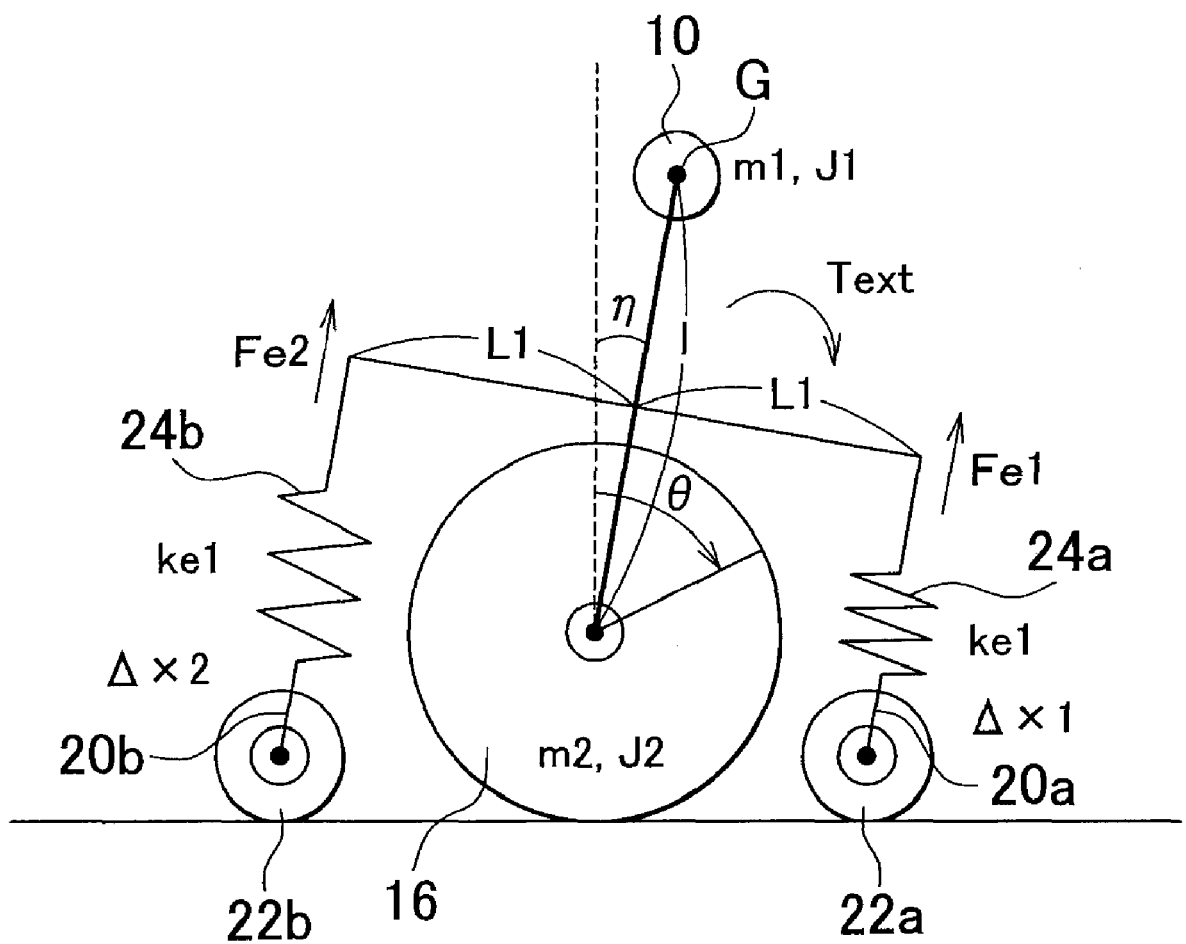
FIG. 5 is a view that illustrates the model of the mobile unit.

The model of the mobile unit 100, which is utilized when the control system of the inverted pendulum control unit 54 is being designed, will be described. FIG. 5 shows the model of the mobile unit 100. This model considers the contacts between the support legs 20a and 20b (auxiliary wheels 22a and 22b) and the ground, that is, floor reaction forces. The broken line in FIG. 5 represents the vertical line. The meanings of the signs shown in FIG. 5 are listed below.

m1: mass of the body 10
m2: mass of the two driving wheels 16
J1: inertia of the body 10 about the center of gravity
J2: inertia of the driving wheels 16 about the axles 14
l: distance between the center of gravity of the body 10 and the axles 14
L1: distance between the center of the body 10 and each of the auxiliary wheels 22a and 22b
ke1: spring constant of each of the springs 24a and 24b
η: tilting angle of the body 10 with respect to the vertical direction
Δx1, Δx2: displacements of the respective support legs 20a and 20b (with reference to the positions when the tilting angle η of the body 10 is zero)
θ: rotational angle of each driving wheel 16
Fe1, Fe2: spring forces (that is, floor reaction forces) generated by the respective springs 24a and 24b
Text: moment about the axles 14, caused by the floor reaction forces In addition, the meanings of the signs used in the following Expression are listed below.
r: radius of each driving wheel 16
d: distance between the two driving wheels 16
fr: coefficient of viscosity
Jm: inertia of the motor rotors (including speed reducers)
n: gear ratio of each speed reducer
g: gravitational acceleration It is assumed that the floor reaction forces are generated in proportion to the tilting angle η of the body 10. In the model shown in FIG. 1A and FIG. 1B, the torque Text that is exerted in a direction to raise the tilted body 10 is expressed by the following (Expression 6).

$$T_{ext} = L1 \times (-Fe1 + Fe2) \quad \text{[Expression 6]}$$
$$= L1 \times ke1(-\Delta x1 + \Delta x2)$$
$$= L1 \times ke1 \times 2L1\tan\eta$$
$$= K_{ext} \times \tan\eta$$

where, $$K_{ext} = 2L1^2 \times Ke1$$

The equation of motion of the mobile unit 100 that considers the torque Text is expressed by the following (Expression 7).

$$(m_1 l^2 + J_1 + n^2 J_m)\ddot{\eta} + m_1 r l \cos\eta \ddot{\theta} - \quad \text{[Expression 7]}$$
$$m_1 lg\sin\eta + K_{ext}\tan\eta + f_r(\dot{\eta} - \dot{\theta}) = -nu$$
$$m_1 r l \cos\eta \ddot{\eta} + \{(m_1 + m_2)r^2 + J_2 + n^2 J_m\}\ddot{\theta} -$$
$$m_1 r l \dot{\eta}^2 \sin\eta + f_r(\dot{\theta} - \dot{\eta}) = nu$$

When (Expression 6) is linearized on the assumption that η is sufficiently small, the following (Expression 8) is obtained.

$$A_0 \begin{bmatrix} \ddot{\eta} \\ \ddot{\theta} \end{bmatrix} + B_0 \begin{bmatrix} \eta \\ \theta \end{bmatrix} + C_0 \begin{bmatrix} \dot{\eta} \\ \dot{\theta} \end{bmatrix} = D_0 u \quad \text{[Expression 8]}$$

$$A_0 \begin{bmatrix} m_1 l^2 + J_1 + n^2 J_m & m_1 rl \\ -m_1 rl & (m_1 + m_2)r^2 + J_2 + n^2 J_m \end{bmatrix}$$

$$B_0 = \begin{bmatrix} -m_1 lg + K_{ext} & 0 \\ 0 & 0 \end{bmatrix},$$

$$C_0 = \begin{bmatrix} f_r & -f_r \\ -f_r & f_r \end{bmatrix}$$

$$D_0 = \begin{bmatrix} -n \\ n \end{bmatrix}$$

but, $$\tan\eta = \frac{\sin\eta}{\cos\eta},$$

$$\sin\eta \cong \eta,$$

$$\cos\eta \cong 1$$

The state quantities are set to the following (Expression 9).

$$x_g = \begin{bmatrix} \eta \\ \theta \\ \dot{\eta} \\ \dot{\theta} \end{bmatrix} \quad \text{[Expression 9]}$$

From (Expression 8) and (Expression 9), the equation of state of (Expression 10) is obtained.

$$\dot{x}_g = A_g x_g + B_g u \quad \text{[Expression 10]}$$

$$x_g = \begin{bmatrix} \eta \\ \theta \\ \dot{\eta} \\ \dot{\theta} \end{bmatrix},$$

$$A_g = \begin{bmatrix} 0 & 0 & 1 & 0 \\ 0 & 0 & 0 & 1 \\ \hline -A_0^{-1} B_0 & -A_0^{-1} C_0 \end{bmatrix}$$

$$B_g = \begin{bmatrix} 0 \\ 0 \\ \hline A_0^{-1} D_0 \end{bmatrix}$$

The equation of state of (Expression 10) is the model of the mobile unit 100 that considers the floor reaction forces received by the support legs 20*a* and 20*b* (auxiliary wheels 22*a* and 22*b*). The inverted pendulum control may be designed on the basis of the model of (Expression 10). The designed inverted pendulum control is able to keep the balance of the body 10 even when the support legs 20*a* and 20*b* receive the floor reaction forces. Note that this model is one example, and another model of the mobile unit may be utilized for the inverted pendulum control.

The mobile unit 100 includes the support legs 20*a* and 20*b* that are constantly in contact with the ground before and behind the axles of the driving wheels. Because the support legs 20*a* and 20*b* are constantly in contact with the ground, when the inverted pendulum control is stopped, the body 10 does not wobble (without a time lag from the time when the inverted pendulum control is stopped), it is possible to support the body 10 by the support legs 20*a* and 20*b*. In other words, when the inverted pendulum control shifts from a functioning state into a non-functioning state, it is possible to support the body 10 by the support legs 20*a* and 20*b* without a time lag. Because of no time lag, when the inverted pendulum control is stopped or when an unexpected event occurs, it is possible to avoid wobbling the body 10 and support the body 10 by the support legs 20*a* and 20*b*.

When the support legs 20*a* and 20*b* are constantly in contact with the ground, the support legs 20*a* and 20*b* receive the floor reaction forces from the ground. Then, the control system of the inverted pendulum control unit 54 is designed on the basis of the model of the mobile unit that considers the floor reaction forces, so it is possible to reduce the likelihood that the body 10 falls because of the influence of the floor reaction forces. Therefore, although the support legs 20*a* and 20*b* are constantly in contact with the ground, it is possible to keep the balance of the body. The floor reaction forces adversely influence the balance keeping of the body, for example, when the auxiliary wheel runs over a bump on the ground.

The specific example of the embodiment is described in detail above; however, it is just illustrative and not intended to limit the scope of the claims. The technique recited in the appended claims also encompass various modifications, alterations and improvements of the above illustrated specific example.

Figure 6:
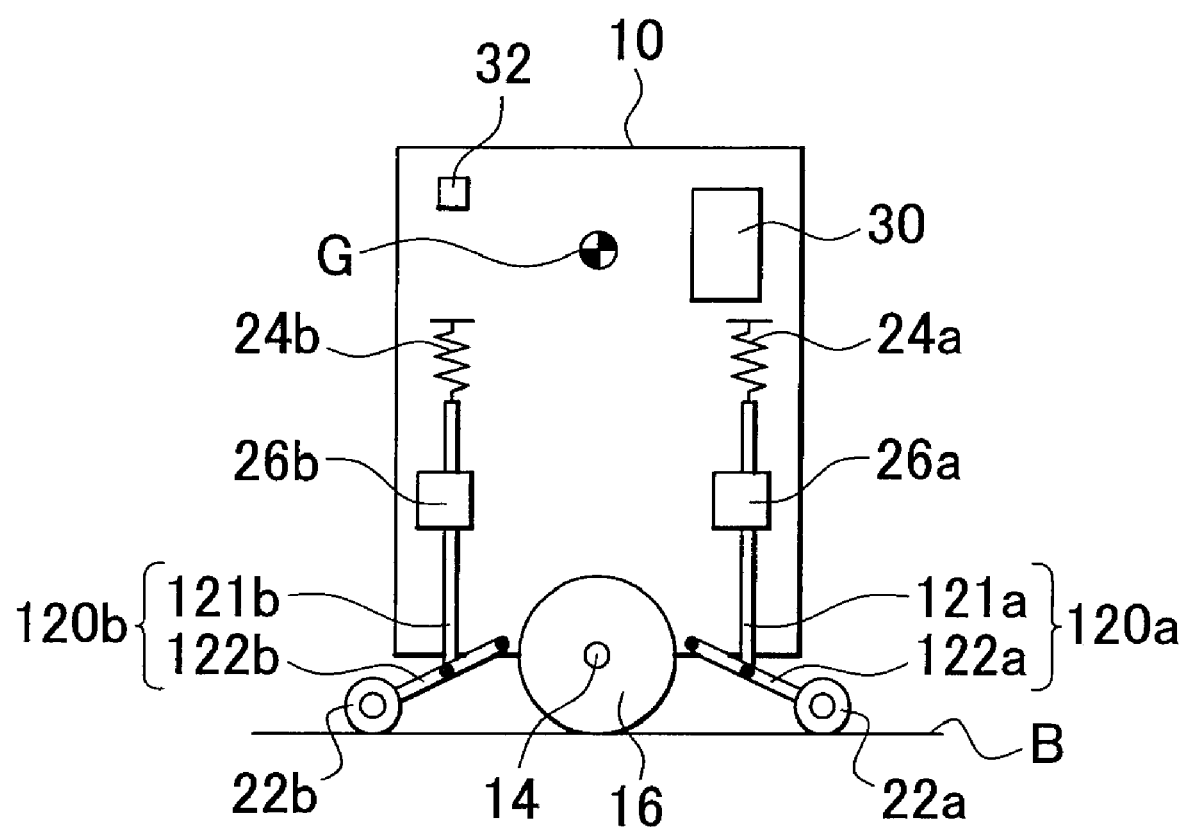
FIG. 6 is a schematic side view of another example of a mobile unit.

For example, the structure of the support legs is not limited to the structure shown in FIG. 1A and FIG. 1B. FIG. 6 shows a schematic side view of a mobile unit 200 provided with support legs having another structure. In FIG. 6, like reference numerals denote like components to those of the mobile unit 100 shown in FIG. 1B. A support leg 120*a* of the mobile unit 200 includes a first rod 121*a* and a second rod 122*a*. The first rod 121*a*, as well as the support leg 20*a* of the mobile unit 100 shown in FIG. 1A and FIG. 1B, is coupled to the body 10 using the spring 24*a*. In addition, the brake 26*a* is attached to the first rod 121*a*, as well as the support leg 20*a* of the mobile unit 100 shown in FIG. 1A and FIG. 1B. However, the second rod 122*a* is coupled to the bottom end of the first rod 121*a*, instead of the auxiliary wheel. One end of the second rod 122*a* is pivotably coupled to the body 10. The auxiliary wheel 22*a* is attached on the other end of the second rod 122*a*. The bottom end of the first rod 121*a* is coupled to the middle of the second rod 122*a*. A support leg 120*b* has a similar structure to that of the support leg 120*a*, so the description thereof is omitted. As is apparent from FIG. 6, while the brakes 26*a* and 26*b* are released (unlocked), the bottom ends of the support legs 120*a* and 120*b* move up and down with respect to the body 10 as the body 10 tilts. When the brakes 26*a* and 26*b* are activated, the positions of the bottom ends of the support legs 120*a* and 120*b* are locked, so the body 10 is stably supported.

It is applicable that, when the tilting angle condition that the tilting angle of the body 10 with respect to the vertical direction exceeds the predetermined allowable angle range is satisfied, only the support member on the side to which the body 10 tilts is locked. In this case, it is not necessary to stop the inverted pendulum control. It is also applicable that, when the output torque of each motor reaches a limit, the support members are locked. When the mobile unit is equipped with a sensor that detects a surrounding obstacle, it is also applicable that, when it is determined that there is a likelihood of collision with the obstacle when continuing the inverted pendulum control, the support members are locked.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A wheeled inverted pendulum mobile unit comprising:
a driving wheel;
a body that is tiltable about an axle of the driving wheel with respect to a vertical direction;
a plurality of support members that extend downward from the body in the vertical direction, wherein the bottom ends of the plurality of support members are in contact with a ground before and behind the axle of the driving wheel, and the bottom ends move up and down, with respect to the body, as the body tilts with respect to the vertical direction;
a lock mechanism that locks positions of the bottom ends of the support members with respect to the body; and
a control unit that executes an inverted pendulum control on the body by driving the driving wheel,
wherein the plurality of support members are in contact with the ground without applying a force to the ground during the inverted pendulum control.

2. The wheeled inverted pendulum mobile unit according to claim 1, wherein by releasing the lock mechanism, the plurality of support members are in contact with the ground without applying a force to the ground during the inverted pendulum control.

3. The wheeled inverted pendulum mobile unit according to claim 2, wherein the lock mechanism locks the positions of the bottom ends of the support members with respect to the body when any one of a tilting angle condition that a tilting angle of the body with respect to the vertical direction exceeds a predetermined allowable angle range, a tilting angular velocity condition that a tilting angular velocity of the body exceeds a predetermined allowable tilting angular velocity range, a running velocity condition that a velocity of the wheeled mobile unit exceeds a predetermined allowable velocity range, or a stop condition that the inverted pendulum control is stopped is satisfied.

4. The wheeled inverted pendulum mobile unit according to claim 2, wherein the lock mechanism releases the locked positions of the bottom ends of the support members at the same time when the inverted pendulum control is initiated.

5. The wheeled inverted pendulum mobile unit according to claim 2, wherein: an auxiliary wheel is attached to each of the bottom ends of the plurality of support members; and the control unit detects a slip of the driving wheel on the basis of a difference in rotational angular velocity between each auxiliary wheel and the driving wheel.

6. The wheeled inverted pendulum mobile unit according to claim 1, wherein the plurality of support members are in contact with the ground without applying a force to the ground by means of a built-in elastic member of each of the plurality of support members.

7. The wheeled inverted pendulum mobile unit according to claim 6, wherein the lock mechanism locks the positions of the bottom ends of the support members with respect to the body when any one of a tilting angle condition that a tilting angle of the body with respect to the vertical direction exceeds a predetermined allowable angle range, a tilting angular velocity condition that a tilting angular velocity of the body exceeds a predetermined allowable tilting angular velocity range, a running velocity condition that a velocity of the wheeled mobile unit exceeds a predetermined allowable velocity range, or a stop condition that the inverted pendulum control is stopped is satisfied.

8. The wheeled inverted pendulum mobile unit according to claim 6, wherein the lock mechanism releases the locked positions of the bottom ends of the support members at the same time when the inverted pendulum control is initiated.

9. The wheeled inverted pendulum mobile unit according to claim 6, wherein: an auxiliary wheel is attached to each of the bottom ends of the plurality of support members; and the control unit detects a slip of the driving wheel on the basis of a difference in rotational angular velocity between each auxiliary wheel and the driving wheel.

10. The wheeled inverted pendulum mobile unit according to claim 1, wherein the lock mechanism locks the positions of the bottom ends of the support members with respect to the body when any one of a tilting angle condition that a tilting angle of the body with respect to the vertical direction exceeds a predetermined allowable angle range, a tilting angular velocity condition that a tilting angular velocity of the body exceeds a predetermined allowable tilting angular velocity range, a running velocity condition that a velocity of the wheeled mobile unit exceeds a predetermined allowable velocity range, or a stop condition that the inverted pendulum control is stopped is satisfied.

11. The wheeled inverted pendulum mobile unit according to claim 1, wherein the lock mechanism releases the locked positions of the bottom ends of the support members at the same time when the inverted pendulum control is initiated.

12. The wheeled inverted pendulum mobile unit according to claim 1, wherein: an auxiliary wheel is attached to each of the bottom ends of the plurality of support members; and the control unit detects a slip of the driving wheel on the basis of a difference in rotational angular velocity between each auxiliary wheel and the driving wheel.

13. A wheeled inverted pendulum mobile unit comprising:
a driving wheel;
a body that is tiltable about an axle of the driving wheel with respect to a vertical direction;
a plurality of support members that extend downward from the body in the vertical direction, wherein the bottom ends of the plurality of support members are in contact with a ground before and behind the axle of the driving wheel, and the bottom ends move up and down, with respect to the body, as the body tilts with respect to the vertical direction;
a lock mechanism that locks positions of the bottom ends of the support members with respect to the body; and
a control unit that executes an inverted pendulum control on the body by driving the driving wheel,
wherein an auxiliary wheel is attached to each of the bottom ends of the plurality of support members, and
wherein the control unit detects a slip of the driving wheel on the basis of a difference in rotational angular velocity between each auxiliary wheel and the driving wheel.

14. A wheeled inverted pendulum mobile unit comprising:
a driving wheel;
a body that is tiltable about an axle of the driving wheel with respect to a vertical direction;
a plurality of support members that extend downward from the body in the vertical direction, wherein the bottom ends of the plurality of support members are in contact with a ground before and behind the axle of the driving wheel, and the bottom ends move up and down, with respect to the body, as the body tilts with respect to the vertical direction;

a lock mechanism that locks positions of the bottom ends of the support members with respect to the body; and a control unit that executes an inverted pendulum control on the body by driving the driving wheel, wherein the plurality of support members are in contact with the ground without applying a force to the ground during the inverted pendulum control, and wherein by releasing the lock mechanism, the plurality of support members are in contact with the ground without applying a force to the ground during the inverted pendulum control.

15. A wheeled inverted pendulum mobile unit comprising:

a driving wheel;

a body that is tiltable about an axle of the driving wheel with respect to a vertical direction;

a support member that extends downward from the body in the vertical direction, wherein a bottom end of the support member is in contact with a ground, and the bottom end moves up and down, with respect to the body, as the body tilts with respect to the vertical direction; and a lock mechanism that locks a position of the bottom end of the support member with respect to the body; and a control unit that executes an inverted pendulum control on the body by driving the driving wheel, wherein the support member is in contact with the ground without applying a force to the ground during the inverted pendulum control.

* * * * *